United States Patent [19]

Nève de Mévergnies

[11] Patent Number: 4,787,676
[45] Date of Patent: Nov. 29, 1988

[54] VEHICLE SEAT, NOTABLY FOR MOTOR VEHICLE

[76] Inventor: Marcel Nève de Mévergnies, La Pasture, 6419 Marbaix-la-Tour, Belgium

[21] Appl. No.: 38,771

[22] Filed: Apr. 15, 1987

[30] Foreign Application Priority Data

Apr. 15, 1986 [BE] Belgium .............................. 0/216532

[51] Int. Cl.⁴ .......................... A47C 1/00; A47C 7/40
[52] U.S. Cl. .................... 297/353; 297/285; 248/624
[58] Field of Search ............ 297/353, 285, 297, 299; 248/624, 616, 601

[56] References Cited

U.S. PATENT DOCUMENTS

| 636,726 | 11/1899 | Hindmarsh ................ 248/601 X |
| 1,205,489 | 11/1916 | Stoll .................... 248/624 X |
| 1,265,474 | 5/1918 | Mikulic . |
| 1,669,567 | 3/1928 | Linder . |
| 1,711,476 | 4/1929 | Cravath et al. . |
| 2,590,504 | 3/1952 | Caesar .................... 297/299 |
| 2,690,786 | 10/1954 | Sedlock .................... 297/285 |
| 2,903,043 | 7/1957 | Kenney . |
| 3,275,372 | 9/1966 | Radke et al. ................ 297/285 |
| 3,337,260 | 8/1967 | Proctor . |
| 3,810,263 | 5/1974 | Taylor et al. . |
| 4,157,203 | 6/1979 | Ambasz .................... 297/285 X |

FOREIGN PATENT DOCUMENTS

| 897046 | 10/1983 | Belgium . |
| 1111965 | 7/1961 | Fed. Rep. of Germany . |
| 1405778 | 11/1968 | Fed. Rep. of Germany . |
| 2420277 | 11/1975 | Fed. Rep. of Germany . |
| 3000433 | 9/1981 | Fed. Rep. of Germany . |
| 53-100531 | 2/1978 | Japan . |
| 213530 | 10/1985 | Japan .................... 297/285 |
| 131334 | 2/1929 | Switzerland . |
| 19248 | 8/1909 | United Kingdom .......... 297/285 |
| 236750 | 7/1925 | United Kingdom .......... 297/285 |

*Primary Examiner*—Kenneth J. Dorner
*Assistant Examiner*—Laurie K. Cranmer
*Attorney, Agent, or Firm*—Fleit, Jacobson, Cohn & Price

[57] ABSTRACT

There is described a vehicle seat, notably for motor vehicle, comprising a bottom and a back, that back portion at least whereagainst the back of a person taking place in the seat bears, so cooperating with resilient members as to be swingable about a fixed point relative to the bottom, exclusively with an up-and-down motion, which seat is provided with means to limit conveying from the seat bottom, vibrations with a frequency higher than 10 Hz to that back portion whereagainst said person back does bear.

8 Claims, 1 Drawing Sheet

VEHICLE SEAT, NOTABLY FOR MOTOR VEHICLE

This invention relates to a vehicle seat, notably for motor vehicle, comprising a bottom and a back, at least that back portion a person back bears against when said person takes place in the seat, so cooperating with resilient members as to be swingable about a fixed point relative to the seat, exclusively with an up-and-down motion.

A seat provided with such characteristics is the object of Belgian Pat. No. 897,046.

One essential object of this invention is to provide a seat of the above-defined type which allows to avoid or at least to minimize very efficiently backache for the vehicle passenger, which is caused by the seat vertical oscillations, induced for example by the road unevenness in the case of a motor vehicle.

It has been noted that a wrong selection of the characteristics for the seat-back movable portion, had a nefarious action on the passenger back instead of the favourable action being looked for.

When for example the frequencies peculiar to the bottom when loaded with the passenger and of the back movable portion, are substantially equal, there occurs a resonance phenomenon, in such a way that the back movable portion swinging can have a much larger amplitude than the passengerloaded bottom.

To solve this problem, it has been proposed to design a seat the back movable portion inertia of which was as low as possible.

Even if relatively good results have been obtained with this solution, it has been noted that the practical embodiment, mostly on industrial scale, of a seat fulfilling this requirement, might be quite complex.

One essential object of this invention is to provide a seat of the above-defined type which has a very simple structure which allows without requiring special measures regarding material selection and back component arrangement, to avoid or at least to substantially minimize passenger backache.

For this purpose according to the invention, the seat has means allowing to limit conveying from the seat bottom, vibrations with a frequency higher than 10 Hz to that back portion said person back bears against (Hz=cycles per second).

Advantageously, said resilient members which cooperate with the seat back movable portion have a rigidity lower than 1 kg/cm and preferably between 0.01 kg/cm and 1 kg/cm.

In an advantageous embodiment, that back portion the passenger back bears against is so arranged as to bear on the resilient members and to be guided along the direction of said up-and-down motion.

In a particularly advantageous embodiment of the invention, substantially the whole back is so arranged as to undergo the up-and-down motion relative to the bottom.

In a preferred embodiment of the invention object, the resilient members comprise at least one helical spring slipped over a guide rod which extends along the direction of said up-and-down motion, said rod being fixed relative to a back portion and sliding relative to the other portion along said direction.

Other details and features of the invention will stand out from the following description given hereinafter by way of non limitative example, of a particular embodiment of a seat according to the invention.

In both said figures, the same reference numerals pertain to identical elements.

The essential object of this invention is to provide a vehicle seat wherein the relative contribution of inertia action has been changed relative to other factors.

Indeed it has been noted according to the invention, on the basis of tests and measurings made on seats both with completely fixed back, and with a back part at least of which intended to engage the passenger back, is movable, that the most nefarious frequencies for the spinal column lie above 10 Hz.

It was also concluded that it is not always indispensable for the back movable portion the passenger back bears against, to have a low inertia.

Those vibrations a vehicle passenger spinal column is subjected to, particularly in a motor vehicle, are caused by the vibrations from the floor whereon the seat the passenger sits in, is secured.

According to this invention, the main quality the complete seat should have, that is the bottom and the back, lies in the structure being such that the vehicle floor vibrations with a frequency higher than 10 Hz, do not reach the passenger spinal column.

Usually a vehicle seat bottom has a rather soft springing to insure the passenger comfort. Typically such springing has a stiffness or rigidity from 15 to 30 kg/cm. Such a springing system loaded with a passenger weighing about 75 kg, strongly damps vibrations with a frequency higher than 10 Hz. Moreover human body morphology is such that the passenger buttocks also comprise a good absorber for frequencies higher than 10 Hz. To sum up, vibrations with a frequency higher than 10 Hz originating from the vehicle floor, particularly a motor vehicle floor, will substantially not be conveyed to the passenger spinal column through the bottom of that seat the passenger is seated in.

On the other hand, when the seat back is not movable or when it does not comprise any movable portion for the passenger back, vibrations higher than 10 Hz will not be damped, and such floor vibrations can thus reach the passenger spinal column through the seat back.

Generally, the invention relates to a seat to be used in any vehicle type, notably a motor car, a motor bus, a truck, a tractor, etc.

A particular embodiment of a seat according to the invention, provided with the above-defined characteristics, has been shown in the accompanying figures.

Said seat comprises a bottom 1 and a back 2, which is preferably hinged to the back portion of said bottom.

Figure 1:
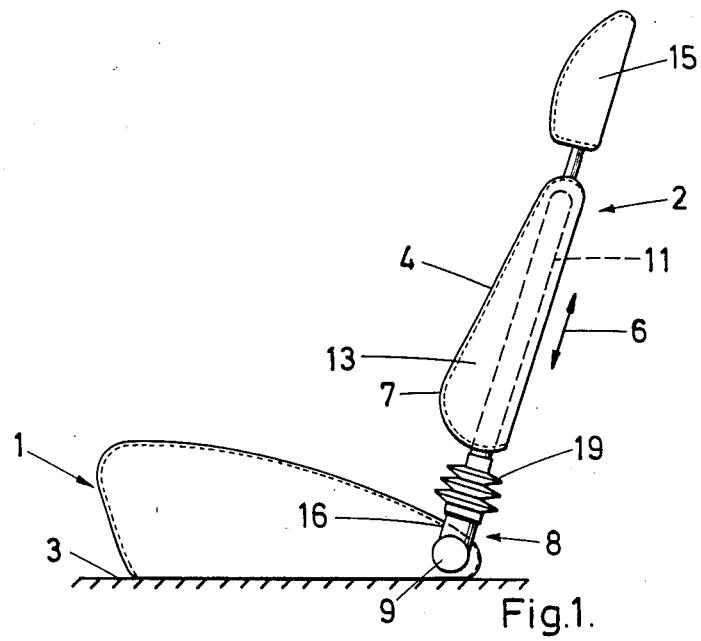
FIG. 1 is a diagrammatic side view of a seat in said particular embodiment of the invention.

In the case of a motor car, motor bus or truck, the bottom 1 is secured, possibly with a horizontal slidability, to the vehicle floor 3. As these are conventional attachment means, they have not been shown in FIG. 1.

At least that portion 4 from seat back 2 whereon the back of a person taking place in the seat, will bear, cooperates with resilient members 5 in such a way as to thus let said portion 4 move along one and the same direction with an up-and-down motion, as shown by arrows 6, relative to said bottom 1.

Said seat has for characteristic that said resilient members 5 have a low rigidity with a value lower than 1 kg/cm and lying preferably between 0.01 and 1 kg/cm.

In the embodiment as shown in the figures, that portion 4 from back 2 whereon the person back does bear, is so arranged as to bear on said resilient members 5 and to be guided along the direction 6 of the up-and-down motion.

More particularly, substantially the whole seat back is so mounted as to undergo said up-and-down motion relative to said bottom 1.

Thus in said particular embodiment, the lower portion from back 2 cooperates through resilient means 5, with a holder 8 which is preferably mounted on the back portion from bottom 1 through a hinge 9, thus allowing to adjust the angle of the back relative to the bottom.

Figure 2:
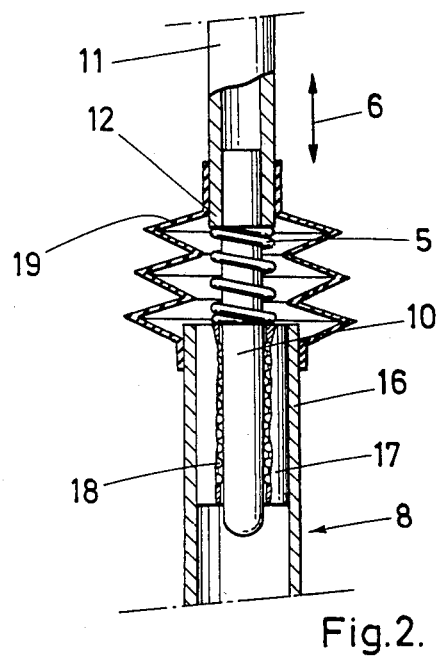
FIG. 2 shows on a larger scale, a lengthwise section through an essential part of the seat in said particular embodiment.

As clearly shown in FIG. 2, still in said partilar embodiment, the resilient members 5 are comprised of a helical spring slipped over a guide rod 10 which extends along the direction of said up-and-down motion of back 2, as shown with arrow 6.

The one end of said rod 10 is fixed relative to the movable portion from back 2, the other rod end being slidably mounted in holder 8, along the direction of arrow 6.

In actual practice, as shown in the figures, the back 2 may comprise a metal frame comprised for example of a tube 11 in reverse U-shape, in each one of the two free ends 12 of which, a rod 10 is secured.

The holder 8 may be comprised of two tube lengths 16, the lower end of which is integral with hinge 9, to allow locking thereof in an adjustable angular position relative to the bottom, and the top end of which is provided with a tube-like slideway 17 with balls 18, wherein the rod 10 is slidable with a minimum of friction.

Finally, a flexible rubber sleeve 19 connects the facing ends of frame 11 and tube lengths 16, thus covering spring 5 and rod 10.

Said spring 5 lets the back movable portion 4 swing about a fixed point relative to bottom 1, said fixed point corresponding to that position the seat back lies in as the vehicle is stopped.

Thus the lumbar rest 7 of the movable portion 4 from back 2 will suitably follow the swinging movements of the passenger back. This is for example not the case when said movable portion is comprised of a simple endless belt mounted about freely-rotatable rollers.

Said frame 11 may be provided with a shaped foam cushion 13, for example, whereagainst the back can bear, as well as with a head-rest 15 arranged at the top of frame 11.

In view of the pressure being exerted by the back of a person seated in the seat, against portion 4 from back 2, said latter back will follow accurately the up-and-down swinging motion of the passenger back.

It must be understood that the invention is in no way limited to the above embodiments and that many changes may be brought thereto without departing from the scope of the invention as defined by the appended claims.

For instance, in some cases, the seat back will not be hinged to the seat.

What is claimed is:

1. A vehicle seat comprising a seat bottom for an occupant to sit on and a seat back, the seat back having a portion for the occupant's back to rest against and means for minimizing transmission of vibrations with a frequency higher than 10 Hz from the seat bottom to said portion of the back, including resilient means connected between said portion of the seat back and the seat bottom for providing vertical reciprocation of said portion of the seat back relative to the seat bottom.

2. A seat as defined in claim 1, wherein the resilient means has a rigidity lower than 1 kg/cm.

3. A seat as defined in claim 2, wherein said rigidity is between 0.01 and 1 kg/cm.

4. A seat as defined in claim 1, wherein said portion of the seat back is carried on the resilient means.

5. A seat as defined in claim 1, wherein the seat back has a lower part connected to the seat bottom and an upper part defining said portion of the seat back, and wherein said resilient means is connected between the upper and lower parts.

6. A seat as defined in claim 5, including a hinge connection between the seat bottom and the lower part of the seat back.

7. A seat as defined in claim 5, wherein the resilient means includes coil spring means surrounding guide rod means connected between said portion of the seat back and the seat bottom.

8. A seat as defined in claim 7, wherein the guide rod means is carried by said portion of the seat back, and the seat bottom has a part connected thereto which includes tubular receiving means for the guide rod means.

* * * * *